No. 682,977. Patented Sept. 17, 1901.
E. A. DIBBENS.
RESILIENT OR ELASTIC TIRE.
(Application filed Feb. 28, 1901.)

(No Model.)

WITNESSES:

INVENTOR.
E. A. Dibbens
BY
ATTORNEY.

THE NORRIS PETERS CO., PHOTO-LITHO., WASHINGTON, D. C.

UNITED STATES PATENT OFFICE.

ERNEST ALBERT DIBBENS, OF DENVER, COLORADO, ASSIGNOR TO CHARLES G. FAWKES, OF SAME PLACE.

RESILIENT OR ELASTIC TIRE.

SPECIFICATION forming part of Letters Patent No. 682,977, dated September 17, 1901.

Application filed February 28, 1901. Serial No. 49,289. (No model.)

*To all whom it may concern:*

Be it known that I, ERNEST ALBERT DIBBENS, a citizen of the United States of America, residing at Denver, in the county of Arapahoe and State of Colorado, have invented certain new and useful Improvements in Resilient or Elastic Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in elastic or cushion tires for wheels, my object being to provide a tire having a relatively narrow tread or portion which engages the surface upon which the tire rests, but which shall at the same time possess the necessary degree of resiliency or yielding capacity for use on the wheels of bicycles, velocipedes, and vehicles or wherever a tire of this class is required.

My improved device is termed an "elastic" or "cushion" tire to distinguish it from tires of the inflatable or pneumatic class.

The invention will now be described in detail, reference being made to the accompanying drawings, in which is illustrated an embodiment thereof.

Figure 1:
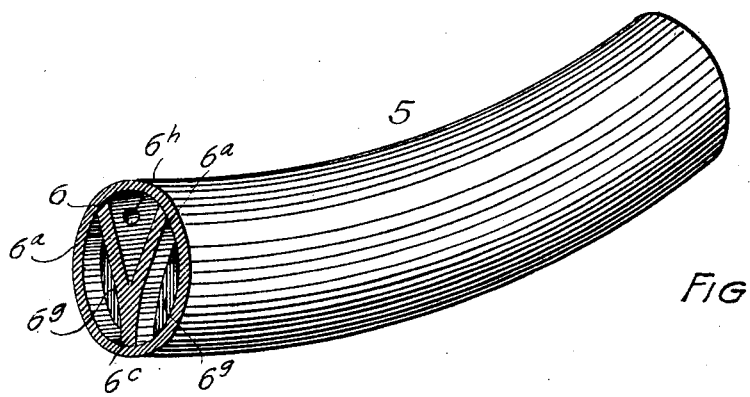
Figure 2:
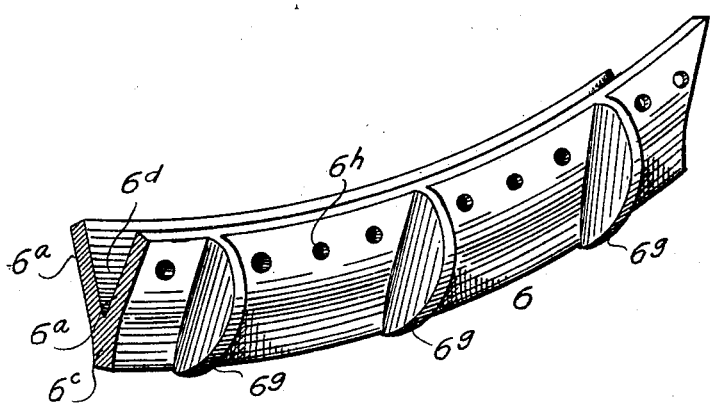
Figure 3:
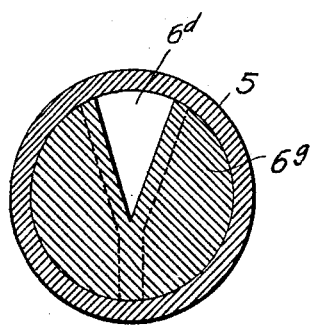
Figure 4:
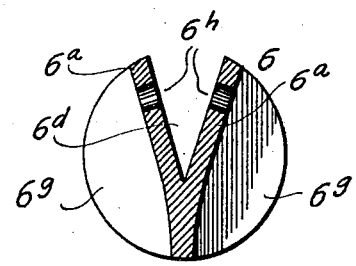

In the drawings, Figure 1 is a perspective view of a portion of my improved tire, one extremity of which is shown in cross-section. Fig. 2 is a perspective view showing the inner portion of the tire detached from the hood or tire-covering. Fig. 3 is a cross-section taken through the tire, cutting the side wings or lugs. Fig. 4 is a cross-section taken through the filling intermediate the side wings or lugs.

The same reference characters indicate the same parts in all the views.

Let the numeral 5 designate the hood or outer covering of the tire, and 6 the filling or cushion portion, which supports the hood and maintains its cylindrical form. This cushion portion or filling is composed of two inclined side members $6^a$, open at the top or adjacent the inner or smaller periphery of the hood, the opposite edges of these members being united to form a rib $6^c$ of suitable depth, located adjacent the outer or larger periphery of the hood. The parts $6^a$ are separated by a V-shaped opening, and their outer surfaces are provided with lugs or wings $6^g$, whose outer edges are curved to conform to the inner concave surface of the hood. The lugs or wings $6^g$ are located at suitable intervals to give the tire the necessary internal resistance. The members $6^a$ may be provided with openings $6^h$, whose tendency is to increase the resiliency of the tire. The parts of the filling are vulcanized together, and the filling is vulcanized to the inner surface of the hood.

By virtue of the construction of the filling 6, as heretofore described, whereby the V-shaped opening between the members $6^a$ is located adjacent the inner periphery of the hood and the ribs $6^c$ adjacent its outer periphery or tread, the tire yields chiefly at its inner periphery, and while it possesses the desired degree of resiliency or yielding capacity the tread of the tire maintains substantially its normal shape under pressure and does not flatten out, as is the case with pneumatic tires. Hence the tread or surface-engaging portion of my improved tire becomes very narrow, lessening the surface resistance and the power required to propel the bicycle, velocipede, or vehicle equipped with these tires.

Having thus described my invention, what I claim is—

1. In a wheel-tire, the combination with the outer covering or hood, of an elastic filling located within the hood and comprising two inclined side members separated by a V-shaped opening whose base is adjacent the inner periphery of the hood, the said members forming a junction and merging into a rib located adjacent the outer periphery or tread of the tire, the inclined side members being provided with lugs or wings applied to their outer surfaces at suitable intervals.

2. In a wheel-tire, the combination with the outer covering or hood, of an elastic filling located within the hood and comprising two inclined side parts separated by an opening adjacent the inner periphery of the hood, the said parts joining and merging into a rib located adjacent the outer periphery or tread of the tire, the inclined side parts being provided with wings or lugs applied to their outer surfaces at suitable intervals, their outer edges being curved to conform to the inner concave surface of the hood.

3. In a tire of the class described, the combination with a hood, of a resilient filling located in the hood and composed of two parts forming an angle with each other and separated by an opening which is widest at the inner periphery of the hood, the said members merging at their intersection into a rib of suitable depth located adjacent the tread of the hood, and wings or lugs applied to the outer surfaces of the said parts, at suitable intervals to give the hood the necessary internal resistance.

4. In a tire of the class described, the combination with a hood, of an elastic or resilient filling located therein and composed of two parts forming an angle with each other and separated by a wedge-shaped opening whose base is located at the inner periphery of the hood, the two parts at their angles, merging into a rib of suitable depth located adjacent the tread of the hood, wings or lugs applied to the outer surfaces of said parts and curved to conform to the inner concave surface of the hood, the parts of the elastic filling being vulcanized together to form a substantially integral device, and the said filling being vulcanized to the inner surface of the hood.

5. In a wheel-tire, the combination with a hood, of two inclined parts separated by a V-shaped opening which is widest at the inner periphery of the hood, the said parts merging into a rib of suitable depth which is located adjacent the tread of the hood, lugs or wings applied to the outer surface of the said parts, which parts are provided with openings or perforations located intermediate the lugs.

In testimony whereof I affix my signature in presence of two witnesses.

ERNEST ALBERT DIBBENS.

Witnesses:
J. H. BOEKENFELD,
DORA C. SHICK.